US012769660B1

(12) United States Patent
Sadayan Ebramsah Mo Abdul et al.

(10) Patent No.: US 12,769,660 B1
(45) Date of Patent: Oct. 20, 2026

(54) STORE GATHER BUFFER HAVING AN AUTOMATICALLY ADJUSTABLE MERGE PERIOD

(71) Applicant: Google LLC, Mountain View, CA (US)

(72) Inventors: Sadayan Ghows Ghani Sadayan Ebramsah Mo Abdul, Austin, TX (US); Abhijna Balu, Austin, TX (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/212,065

(22) Filed: May 19, 2025

(51) Int. Cl.
*G06F 12/08* (2016.01)
*G06F 12/0815* (2016.01)

(52) U.S. Cl.
CPC .... *G06F 12/0815* (2013.01); *G06F 2212/604* (2013.01)

(58) Field of Classification Search
CPC ....................... G06F 12/0815; G06F 2212/604
See application file for complete search history.

(56) References Cited

U.S. PATENT DOCUMENTS

| | | | | |
|---|---|---|---|---|
| 8,117,390 | B2 * | 2/2012 | Cummings | G06F 12/0897 711/119 |
| 11,520,704 | B1 * | 12/2022 | Cordes | G06F 12/0875 |
| 2007/0266206 | A1 * | 11/2007 | Kim | G06F 12/0815 711/E12.027 |
| 2014/0359220 | A1 * | 12/2014 | Koker | G06F 12/0811 711/121 |
| 2016/0170883 | A1 * | 6/2016 | Sasanka | G06F 12/0886 711/122 |
| 2020/0065006 | A1 * | 2/2020 | Yen | G06F 12/0871 |
| 2020/0142699 | A1 * | 5/2020 | Brown | G06F 9/3824 |
| 2026/0079716 | A1 * | 3/2026 | Tan | G06F 9/30043 |
| 2026/0119172 | A1 * | 4/2026 | Lee | G06F 9/30036 |

* cited by examiner

*Primary Examiner* — Kevin Verbrugge
(74) *Attorney, Agent, or Firm* — Brake Hughes Bellermann LLP

(57) ABSTRACT

A store gather buffer is disclosed that can determine when to close/drain an entry so that it does not waste clock cycles waiting for data (i.e., stores) that will never arrive. The store gather buffer is configured to determine byte-patterns of entries as they are drained. When a particular byte-pattern appears multiple times, then the store gather buffer can remember this byte-pattern as a reference byte-pattern. During a subsequent merge period, if an accumulated byte-pattern in an entry matches this reference byte-pattern, then the merge period can be ended early, and the entry can be closed/drained.

20 Claims, 9 Drawing Sheets

| TIME | STORE | BYTES | ACCUMULATED BYTE-PATTERN | | | | MATCH ? |
|---|---|---|---|---|---|---|---|
| | | | A.3 (31 : 24) | A.2 (23 : 16) | A.1 (15 : 8) | A.0 (7 : 0) | |
| t1 | ######## | 7:0 | - - - - - - - - | - - - - - - - - | - - - - - - - - | ######## | NO |
| t2 | ######## | 23:16 | - - - - - - - - | ######## | - - - - - - - - | ######## | YES |
| | | | | | | | |
| | | | | | | | |

ENTRY

CLOSE

FIG. 5A

| TIME | STORE | BYTES | ACCUMULATED BYTE-PATTERN | | | | MATCH ? |
|---|---|---|---|---|---|---|---|
| | | | B.3 (31 : 24) | B.2 (23 : 16) | B.1 (15 : 8) | B.0 (7 : 0) | |
| t1 | ##__##__ | 7:0 | ________ | ________ | ________ | ##__##__ | NO |
| t2 | ##__##__ | 15:8 | ________ | ________ | ##__##__ | ##__##__ | NO |
| t3 | ##__##__ | 23:16 | ________ | ##__##__ | ##__##__ | ##__##__ | NO |
| t4 | ##__##__ | 31:24 | ##__##__ | ##__##__ | ##__##__ | ##__##__ | NO → CLOSE |

ENTRY

FIG. 5B

STORE GATHER BUFFER HAVING AN AUTOMATICALLY ADJUSTABLE MERGE PERIOD

FIELD OF THE DISCLOSURE

The present disclosure relates to processing and more specifically to buffering for a memory in a central processing unit (CPU).

BACKGROUND

A CPU may recall data from a cache, operate on the data, and then write the data back to the cache. A store gather buffer can be used to gather and store data before it is written back to the cache. The store gather buffer may include entries (i.e., locations) configured to store byte segments for a cache line of a cache. The byte segments (i.e., stores) can be received and stored in the store gather buffer independently. Accordingly, these byte segments may arrive at the store gather buffer at different times (i.e., clock cycles), and the store gather buffer can remain open for a merge period to receive all of the byte segments for the cache line. After all the byte segments are gathered, the store gather buffer may close and drain (i.e., write-back) the entries to the corresponding cache line of the cache. Thus, the store gather buffer can greatly simplify the write-back process. For example, the store gather buffer may write all byte segments to a cache line of the cache in a single write operation, which is fast and computationally efficient.

SUMMARY

Waiting for all of the byte segments to be received may be a lengthy process because for some data, not all byte segments are utilized. A store gather buffer is disclosed that can estimate when all byte segments have been received to minimize a merge period while reducing the risk of closing too early, which can make the buffering process faster.

In some aspects, the techniques described herein relate to a method for controlling a store gather buffer, the method including: generating a reference byte-pattern based on a learning process; allocating an entry of the store gather buffer to a cache line of a cache coupled to the store gather buffer; writing stores, received at the store gather buffer, to respective segments of the entry during a merge period; determining, after each of the stores is written, an accumulated byte-pattern in the entry, the accumulated byte-pattern indicating bytes of the cache line that are present and bytes of the cache line that are not present; comparing the accumulated byte-pattern to the reference byte-pattern; closing the store gather buffer before the merge period ends when the accumulated byte-pattern matches the reference byte-pattern; and draining the entry to write-back the accumulated byte-pattern to the cache line of the cache after closing the store gather buffer.

In some aspects, the techniques described herein relate to a store gather buffer, including: a plurality of entries that can be allocated to store respective cache lines of a cache; a memory containing a reference byte-pattern; and logic configured to: write a plurality of stores, received at the store gather buffer, to respective segments of an entry during a merge period; determine, after each store of the plurality of stores is written, an accumulated byte-pattern in the entry, the accumulated byte-pattern indicating bytes of a cache line that are present and bytes of the cache line that are not present; compare the accumulated byte-pattern to the reference byte-pattern; close the store gather buffer before the merge period ends when the accumulated byte-pattern matches the reference byte-pattern; and drain the entry to write-back the accumulated byte-pattern to a corresponding cache line of the cache after closing the store gather buffer.

In some aspects, the techniques described herein relate to a method for controlling a store gather buffer, the method including: allocating a plurality of entries of the store gather buffer to receive stores corresponding to corresponding cache lines of a cache; determining an accumulated byte-pattern each time any entry of the plurality of entries is drained; incrementing a counter when the accumulated byte-pattern matches a reference byte-pattern; validating the reference byte-pattern when a counter is greater than or equal to a threshold; and closing, after the reference byte-pattern is validated, an entry of the store gather buffer as soon as the entry contains an accumulated byte-pattern matching the reference byte-pattern.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 5A is a table illustrating the closure of an entry based on a comparison between an accumulated byte-pattern and the reference byte-pattern of FIG. 4 according to a first possible implementation of the present disclosure.

FIG. 5B is a table illustrating the closure of an entry based on a comparison between an accumulated byte-pattern and the reference byte-pattern of FIG. 4 according to a second possible implementation of the present disclosure.

The components in the drawings are not necessarily to scale relative to each other. Like reference numerals designate corresponding parts throughout the several views.

DETAILED DESCRIPTION

A memory (e.g., hard disk, USB drive, cache, etc.) may store and address data in lines (i.e., cache lines) that have a data length (i.e., width) that is larger than the data units (i.e., stores) handled by a processor (i.e., CPU, core, etc.). The processor may read and write these stores to the memory. A store gather buffer, coupled between the CPU and the memory, can be configured to collect the stores so that they can be written to the memory more efficiently. A store gather buffer may have a plurality of entries which can be allocated to receive stores for different addresses (i.e., cache lines) of the memory. After allocation, an entry may collect and attach (i.e., merge) stores addressed to the cache line. The merging process may proceed for a number of cycles (i.e., merge period) before the entry is closed and the stores are written-back to the memory (i.e., drained). The merge period of the entry should be long enough to collect most stores (e.g., all stores) for the address, while not being so long that it delays a reallocation of the entry, which can prevent the buffering of other stores received for a different address. To address this technical problem, a store gather buffer is disclosed, which can automatically adjust (e.g., shorten) the merge period for an entry based on an accumulated byte-pattern in the entry.

Figure 1:
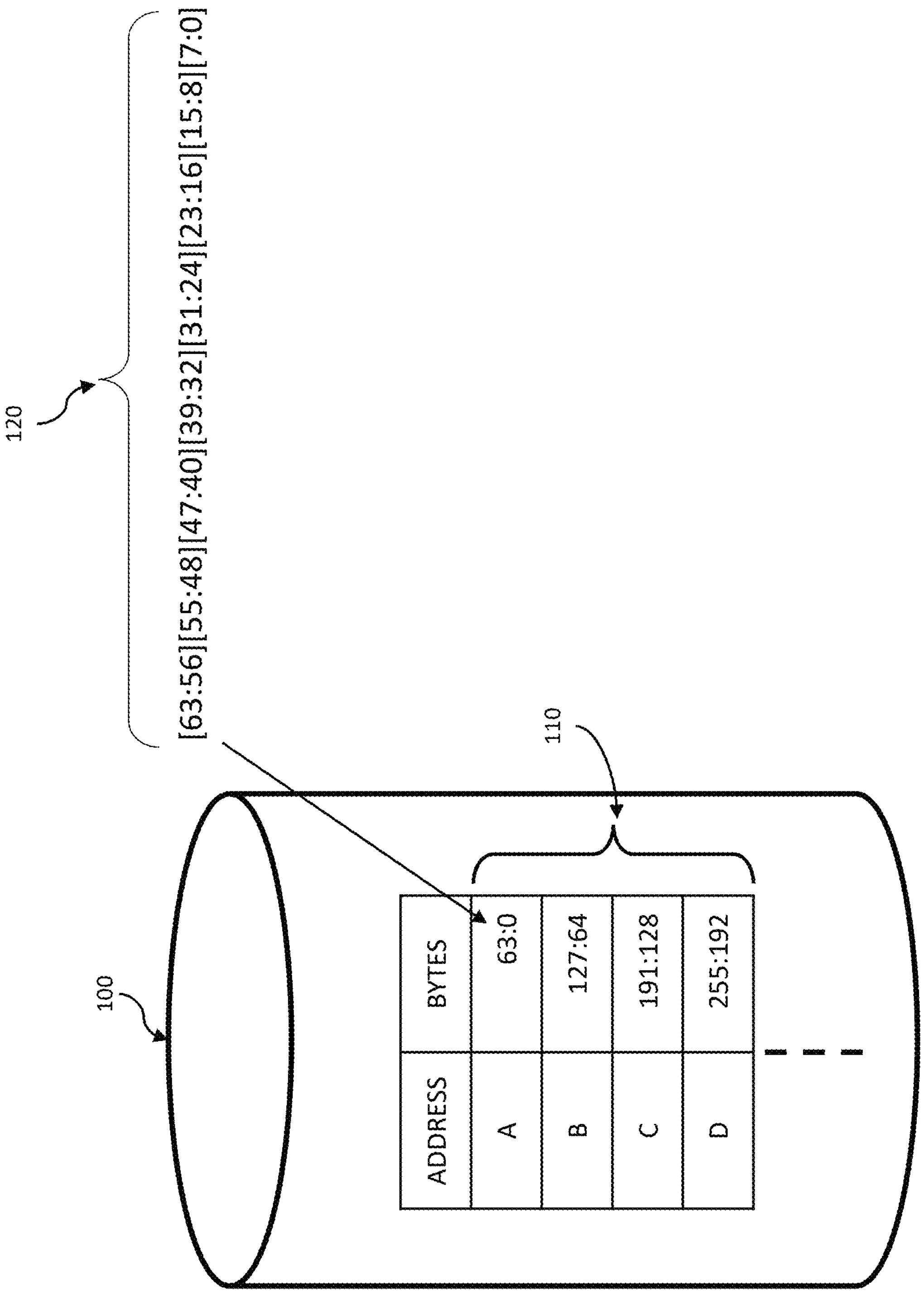
FIG. 1 graphically illustrates a memory according to a possible implementation of the present disclosure.

FIG. 1 graphically illustrates a memory according to a possible implementation of the present disclosure. While the techniques described are not limited to any particular type of memory, the implementation of a cache memory (i.e., cache) will be described. The cache 100 is configured to store bytes of data, which can be enumerated and addressed by byte number. As shown in FIG. 1, cache lines 110, can be assigned addresses (e.g., A, B, C, D), which each represent a different range of bytes within a total range of bytes that can be stored in the cache 100. While the disclosure is not limited to any particular cache size or cache line width, FIG. 1 illustrates a cache 100 having a cache line width of 64 bytes. In possible implementations, cache lines can have other widths (e.g., 32 bytes, 64 bytes, 128 bytes, 256 bytes, etc.), and a size of the cache 100 can be much larger (e.g., 256 kilobytes, 512 kilobytes, etc.) than the widths of the cache lines.

Cache lines may be written-back to the cache 100 incrementally using stores. Each store may be a segment of consecutive bytes of the cache line that when arranged in a sequence can form the cache line. Incrementally writing back to a cache line store-by-store may be inefficient because each write-back operation can include reading the entire cache line, modifying just the bytes of the store, and then writing the modified cache line back to the cache 100. A store gather buffer may be used to avoid this inefficiency by gathering and appending (i.e., merging) a plurality of stores 120 before writing them back to the cache line in a single write-back operation.

Figure 2:
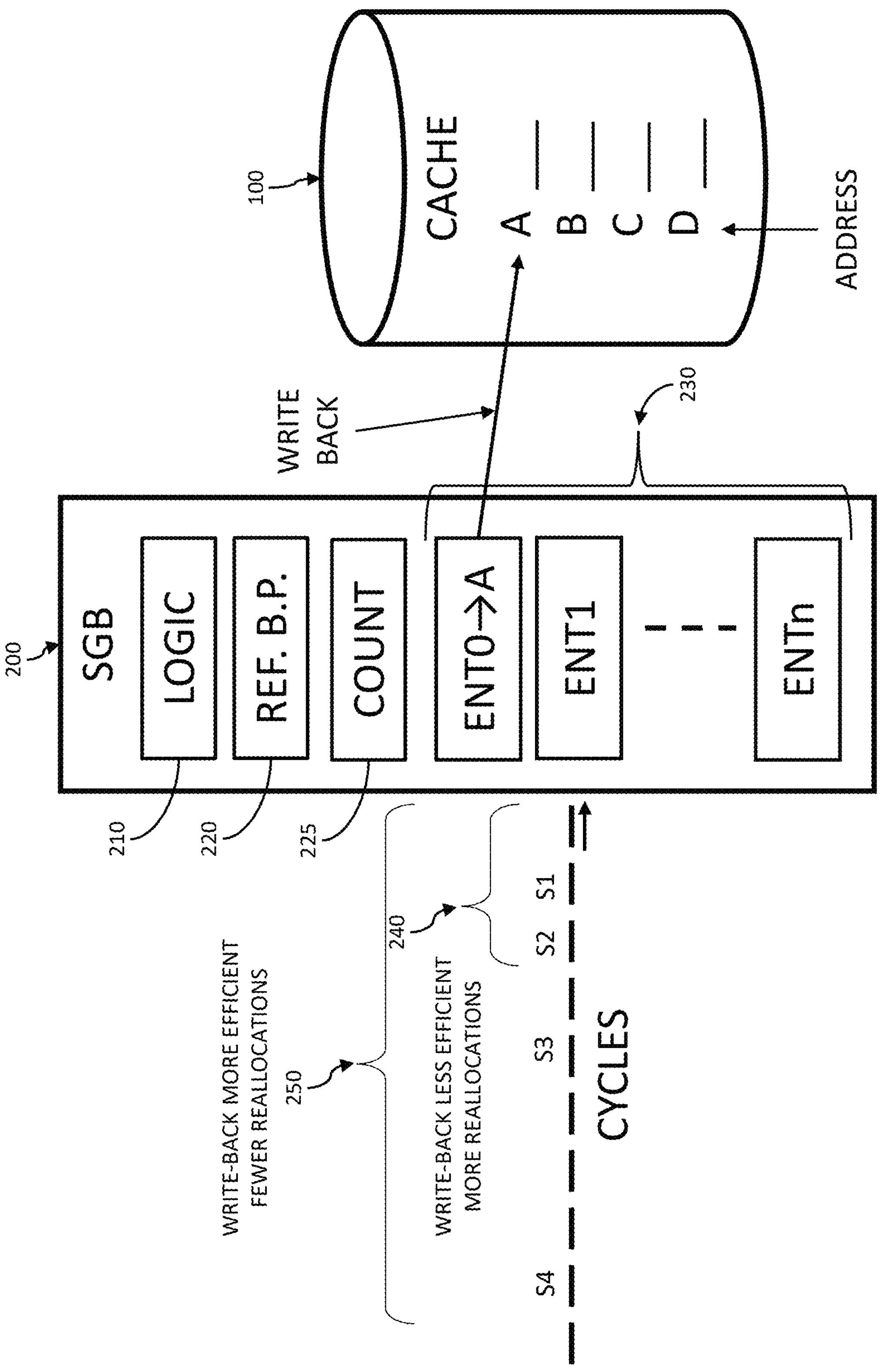
FIG. 2 graphically illustrates a store gather buffer according to a possible implementation of the present disclosure.

FIG. 2 graphically illustrates a store gather buffer according to a possible implementation of the present disclosure. The store gather buffer 200 may include logic 210 (e.g., software, firmware, and/or circuitry) to configure the store gather buffer 200 to perform the operations related to a write-back process (i.e., write-back).

The store gather buffer 200 (i.e., SGB) may further include a plurality of entries 230, which can be allocated, as part of the write-back process, to merge stores of different cache lines of the cache 100. Once allocated, an entry is configured to receive stores for a particular address (i.e., cache line). In other words, after allocation, an entry will be open to receive stores for a cache line.

The store gather buffer 200 may not include an entry for each address of the cache 100 because there may be many more cache lines than entries. Accordingly, after the write-back process is complete, an entry can be allocated again (i.e., reallocated) to the same, or different, address. The reallocation may be based on an address for a store received at the store gather buffer 200 after the write-back process is complete.

Each entry of the plurality of entries 230 may include a plurality of segments. Each segment may correspond to a different store of a cache line. For example, a first segment of the entry may correspond to the first 8 bytes (i.e., [7:0]) of a cache line, a second segment of the entry may correspond to the second 8-bytes (i.e., [15:8]) of the cache line, and so on.

While an entry is merging, stores may be written to their respective segments in the entry. The stores may be merged for a number of clock cycles (i.e., merge period). It may be difficult to know, or predict, an exact merge period because stores arrive at different times (i.e., clock cycles). Ideally, the merge period is long enough for an entry to merge all stores for an address, but a long merge period reduces the rate at which the entry can be allocated.

As shown in FIG. 2, a longer merge period 250 merges more stores (i.e., S1, S2, S3, S4), which can make the write-back to an address more efficient, but the longer merge period 250 reduces a rate at which an entry can be reallocated, which can prevent a received store (or stores) from being merged. Conversely, a shorter merge period 240 merges fewer stores (i.e., S1, S2), which can make the write-back to the address less efficient but the shorter merge period 240 increase the rate at which the entry can be reallocated, which can help all receive stores to be merged.

Figure 3A:
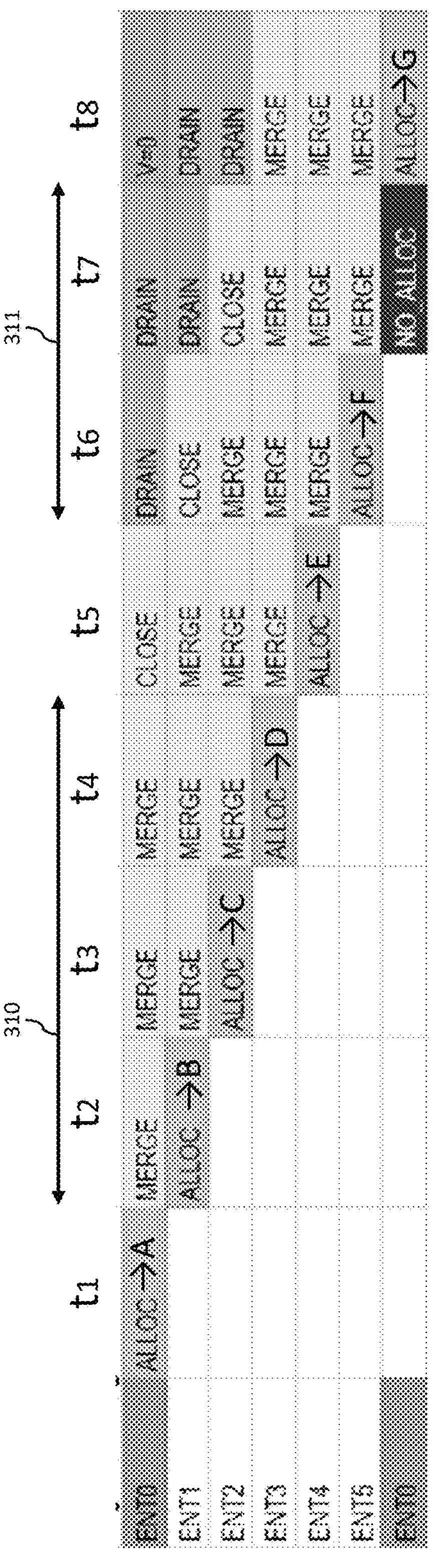
FIG. 3A is a table illustrating a write-back process for entries of a store gather buffer with a longer merge period according to a possible implementation of the present disclosure.

FIG. 3A is a table illustrating a write-back process for entries of a store gather buffer with a longer merge period according to a possible implementation of the present disclosure. Here, reference to the merge period being longer is meant in relation to the shorter merge period illustrated in FIG. 3B. The terms longer and shorter in this context does not imply any particular number of cycles in a merge period.

The table shown in FIG. 3A illustrates the write-back process at eight successive times (i.e., clock cycles $t_1$, $t_2$, $t_3$, $t_4$, $t_5$, $t_6$, $t_7$, and $t_8$) of a store gather buffer having six entries (ENT0, ENT1, ENT2, ENT3, ENT4, ENT5). Each write-back process includes (i) allocating an entry to an address (i.e., ALLOC), (ii) merging stores received for the address (i.e., MERGE), (iii) closing the entry so that no more stores are merged (i.e., CLOSE), and (iv) writing the merged stores back to the cache (i.e., DRAIN). The table is presented as an example and is not intended to limit the disclosure to any particular write-back process for, at least, the reason that implementations of the entry may have different characteristics (e.g., the number of entries, number of clock cycles for each operation, etc.).

At a first clock cycle ($t_1$), the first entry (ENT0) is allocated to a first address (A). At a second clock cycle ($t_2$), the first entry (ENT0) begins merging stores and the second entry (ENT1) is allocated to a second address (B). At a third clock cycle ($t_3$), the first entry (ENT0) and the second entry (ENT1) are merging stores and the third entry (ENT2) is allocated to a third address (C). At a fourth clock cycle ($t_4$), the first, second, and third entries (ENT0, ENT1, ENT2) are merging and the fourth entry (ENT3) is allocated to a fourth address (D). At a fifth clock cycle ($t_5$), the first entry (ENT0) is closed (i.e., the longer merge period 310 ends), the second, third, and fourth entries (ENT1, ENT2, ENT3) are merging, and the fifth entry (ENT3) is allocated to a fifth address (E). At a sixth clock cycle ($t_6$), the first entry (ENT0) begins draining the merge stores back to the cache; the second entry (ENT1) is closed; the fourth, fifth, and sixth entries (ENT3, ENT4, ENT5) are merging; and the sixth entry (ENT5) is allocated to a sixth address (F). At the seventh clock cycle ($t_7$), all entries (ENT0, ENT1, ENT2, ENT3, ENT4, ENT5) are involved with an operation of the write-back process. As a result, no allocation can occur, and a store for a new address must wait until a cycle when an entry is available (i.e., V=0) for allocation. At the eighth clock cycle ($t_8$), the first entry (ENT0) is finished with the write-back process (i.e., idle or V=0). Accordingly, at the eight time (t8) is reallocated (e.g., based on a received store) to a seventh address (G).

This seventh clock cycle ($t_7$), during which a store waited for an entry to become available, can slow the write-back process. One or more wasted clock cycles may be referred to as a bubble in the write-back process and it may be desirable to eliminate bubbles in the write-back process In this case an additional entry (e.g., ENT6) could have eliminated the bubble, however, in practice, bubbles may be larger and the number of entries may be limited due to cost and size constraints.

For each entry, a drain period 311 may be fixed (e.g., two clock cycles) but a merge period may be adjusted based on the information (e.g., bytes) required to be stored in the entry because after receiving all stores, an entry may have bytes with no information (i.e., unused bytes). Further, after receiving all stores for an address, entire segments of an entry may contain no information (i.e., unused segments). In these situations, waiting for stores to fill the unused segments is unnecessary and the entry can be closed after merging the last segment containing information.

A store gather buffer is disclosed which can recognize that it has received all the stores, which are likely to be received for an entry. Based on this recognition, the entry can be closed (early) without waiting for stores, which may never arrive and/or which may not affect the data written back to the cache.

Figure 3B:
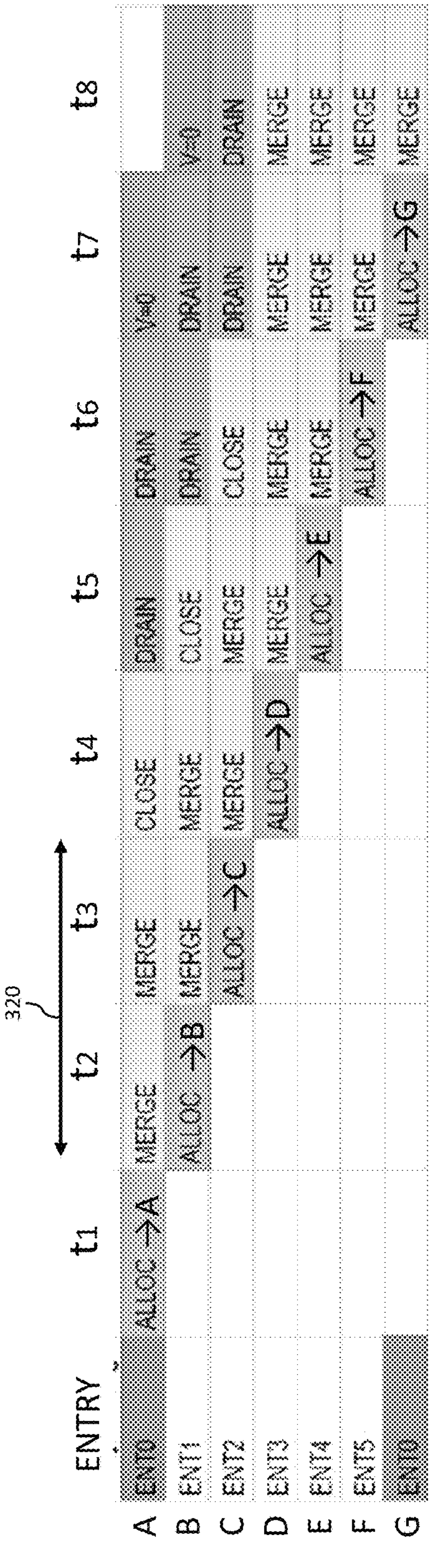
FIG. 3B is a table illustrating a write-back process for entries of a store gather buffer with a shorter merge period according to a possible implementation of the present disclosure.

FIG. 3B is a table illustrating a write-back process for entries of a store gather buffer with a shorter merge period according to a possible implementation of the present disclosure. The shorter merge period 320 shown in FIG. 3B, is shorter than the longer merge period 310 shown in FIG. 3A, while all other aspects of the write-back process are the same. As shown, the shorter merge period eliminates the waste period (i.e., bubble) at the seventh clock cycle ($t_7$). In a possible implementation, the longer merge period 310 is a default merge period for the entries of the store gather buffer, and the shorter merge period 320 results from closing the entries of the store gather buffer before the default merge period ends.

Returning to FIG. 2, logic 210 of the store gather buffer 200 may be configured to monitor the bytes accumulated in each entry, as stores arrive. These bytes may form an accumulated byte pattern based on which bytes have data (i.e., valid). For example, the accumulated byte-pattern of an entry may indicate which bytes have been written to (i.e., are present in) the entry and which bytes have not been written to (i.e., are not present in) the entry. The logic 210 may be further configured to compare the accumulated byte-pattern of each entry to a reference byte-pattern 220 stored at (or otherwise available to) the store gather buffer 200.

A reference byte-pattern may be a byte pattern that is repeated many times in the cache, which may be learned by monitoring the byte-patterns of entries written-back to the cache. Repeating reference byte-patterns may exist because of how a CPU maps data from an application into cache lines. When a byte-pattern appears for a number of successive write-backs, then it may be likely that the next write-back will contain the same byte pattern. Accordingly, the reference byte-pattern 220 may have a count 225 associated with it that corresponds to the number of times the reference byte-pattern 220 has been observed during successive write-backs. The count 225 can be stored in (or otherwise available to) the store gather buffer 200.

Figure 4:
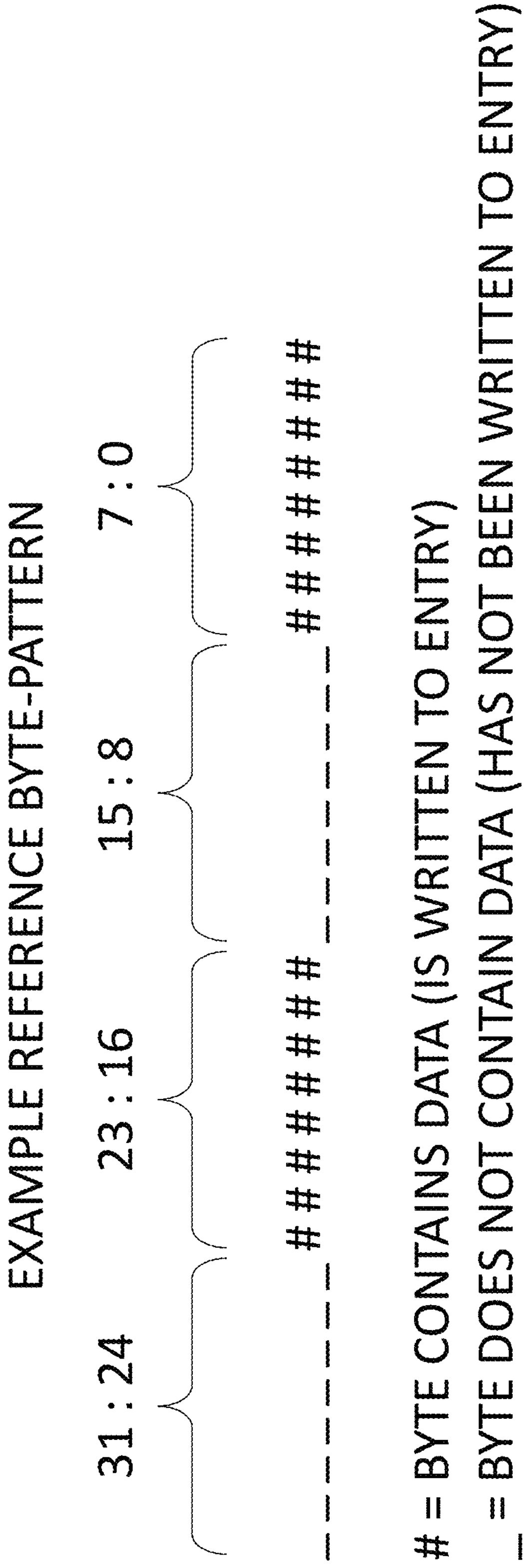
FIG. 4 illustrates a reference byte-pattern according to a possible implementation of the present disclosure.

FIG. 4 illustrates a reference byte-pattern according to a possible implementation of the present disclosure. The reference byte-pattern includes a string of bits. Each bit location corresponds to a byte of a cache line. As shown, a 32-byte cache line having four 8-byte stores may have a corresponding reference byte-pattern. The reference byte-pattern may include a first symbol (e.g., #, 1, etc.) that corresponds to bytes containing data (i.e., valid bytes) and a second symbol (e.g., _, 0, etc.) that corresponds to bytes not containing data (i.e., not valid bytes). A symbol does not represent data but rather whether data exists in the byte (e.g., symbol=1) or data does not exist in the byte (e.g., symbol=0).

An accumulated byte-pattern can be constructed segment-by-segment as each store is received. The accumulated byte-pattern may include first symbol (e.g., #, 1, etc.) that corresponds to bytes written to the entry (i.e., present in the entry) and a second symbol (e.g., _, 0, etc.) that corresponding to bytes not written to the entry i.e., not present in the entry). The comparison of the accumulated byte-pattern to the reference byte-pattern may include comparing each bit. A match indicates that all bits of the reference byte-pattern equal all bits of the accumulated byte-pattern. An entry may be closed after a match is determined.

FIG. 5A is a table illustrating the closure of an entry based on a comparison between an accumulated byte-pattern and the reference byte-pattern of FIG. 4 according to a first possible implementation of the present disclosure. The table illustrates a first entry allocated to a first cache line (A) of the cache. The entry includes a plurality of segments (A.0, A.1, A.2, A.3) configured to store a plurality of stores. A first segment (A.0) is configured to hold a store corresponding to the first 8-bytes (7:0) of a cache line, the second segment (A.1) is configured to hold a store corresponding to the second 8-bytes (15:8) of the cache line, the third segment (A.2) is configured to hold a store corresponding to the third 8-bytes (23:16) of the cache line, and the fourth segment (A.3) is configured to hold a store corresponding to the fourth 8-bytes (31:24) of the cache line.

At a first time (t1) (e.g., clock cycle), a first store is received at the store gather buffer. The first store corresponds to the first 8-bytes (7:0) of the cache line. Accordingly, the first store is merged into the first segment (A.0) of the entry. The first store has data in all 8-bytes, therefore all bytes of the first segment are present (i.e., contain data). A first accumulated byte-pattern at the first time (t1) indicates that all bytes of the first segment are present while no other bytes in the entry are present.

Comparing the first accumulated byte-pattern to the reference byte-pattern (see FIG. 4) does not result in a match. Accordingly, the entry can remain open to receive a second store at a second time (t2) during the merge period.

At the second time (t2), a second store is received at the store gather buffer. The second store corresponds to the third 8-bytes (23:16) of the cache line. Accordingly, the second store is merged into the third segment (A.2) of the entry. The second store has data in all 8-bytes, therefore all bytes of the third segment are present (i.e., contain data). The first store and the second store form a second accumulated byte pattern. The second accumulated byte pattern at the second time (t2) indicates that all bytes of the first segment and third segment are present while no other bytes in the entry are present.

Comparing the second accumulated byte-pattern to the reference byte-pattern (see FIG. 4) results in a match. Accordingly, the entry can be closed at the second time (t2). The entry is closed after only two stores were received because the accumulated byte pattern indicated the likelihood that no stores were left to receive. As a result, the entry could be closed before the end of a (normal) merge period.

After closing the entry, data in the entry is written back to the cache according to the address (A) allocated to the entry. Receiving a store for the entry after it is closed indicates that there was at least one additional store for the entry. As a result, the reference byte-pattern may no longer be considered a good indicator of when it is safe to close an entry.

FIG. 5B is a table illustrating the closure of an entry based on a comparison between an accumulated byte-pattern and the reference byte-pattern of FIG. 4 according to a second possible implementation of the present disclosure. The table illustrates a second entry allocated to a second cache line (B) of the cache. The second entry includes the plurality of segments as described above.

At a first time (t1) (e.g., clock cycle) during a merge period, a first store is received at the store gather buffer. The first store corresponds to the first 8-bytes (7:0) of the cache line. Accordingly, the first store is merged into a first segment (B.0) of the entry. The first store includes a first portion of bytes (i.e., bytes 2, 3, 6, 7)) having data and a second portion of bytes (i.e., bytes 0, 1, 4, 5)) not having data. A first accumulated byte-pattern at the first time (t1) indicates no bytes are present in the entry other than in the first segment and the bytes in the first segment have a pattern corresponding to the first portion and second portion. The first accumulated byte-pattern does not match the reference byte pattern (see FIG. 4). Accordingly, the entry is not closed and the merge period continues.

At a second time (t2) during a merge period, a second store is received at the store gather buffer. The second store corresponds to the second 8-bytes (15:8) of the cache line. Accordingly, the second store is merged into a second segment (B.1) of the entry. The second store includes a first portion of bytes (i.e., bytes 2, 3, 6, 7)) having data and a second portion of bytes (i.e., bytes 0, 1, 4, 5)) not having data. A second accumulated byte-pattern at the second time (t2) indicates no bytes are present in the entry other than in the first and second segments. The bytes in the second segment have a pattern corresponding to the first portion and second portion. The second accumulated byte-pattern does not match the reference byte pattern (see FIG. 4). Accordingly, the entry is not closed and the merge period continues.

At a third time (t3) during a merge period, a third store is received at the store gather buffer. The third store corresponds to the third 8-bytes (15:8) of the cache line. Accordingly, the third store is merged into a third segment (B.2) of the entry. The third store includes a first portion of bytes (i.e., bytes 2, 3, 6, 7)) having data and a second portion of bytes (i.e., bytes 0, 1, 4, 5)) not having data. A third accumulated byte-pattern at the third time (t3) indicates no bytes are present in the entry other than in the first, second, and third segments. The bytes in the third segment have a pattern corresponding to the first portion and second portion. The third accumulated byte-pattern does not match the reference byte pattern (see FIG. 4). Accordingly, the entry is not closed and the merge period continues.

At a fourth time (t4) during a merge period, a fourth store is received at the store gather buffer. The fourth store corresponds to the fourth 8-bytes (23:16) of the cache line. Accordingly, the fourth store is merged into a fourth segment (B.3) of the entry. The fourth store includes a first portion of bytes (i.e., bytes 2, 3, 6, 7)) having data and a second portion of bytes (i.e., bytes 0, 1, 4, 5)) not having data. A fourth accumulated byte-pattern at the fourth time (t4) indicates bytes are present in all segments. The bytes in the fourth segment have a pattern corresponding to the first portion and second portion. The fourth accumulated byte-pattern does not match the reference byte pattern (see FIG. 4). Accordingly, the entry is not closed as a result of the accumulated byte-pattern. Instead, the merge period can end because the entry is full or in an alternative implementation, the merge period can end after a predetermined number of cycles.

The reference byte-pattern may be generated using a learning process based on the number of times the accumulated byte-pattern (of any entry) matches the reference byte-pattern. Accordingly, after the scenario illustrated in FIG. 5B, in which no match was detected before the merge period ended, the count 225, which corresponds to the validity of the reference byte-pattern, may be reset to zero. In a possible implementation, resetting the count occurs after a threshold number of times that no match was detected before the merge period ends to provide hysteresis to the reset.

Figure 6:
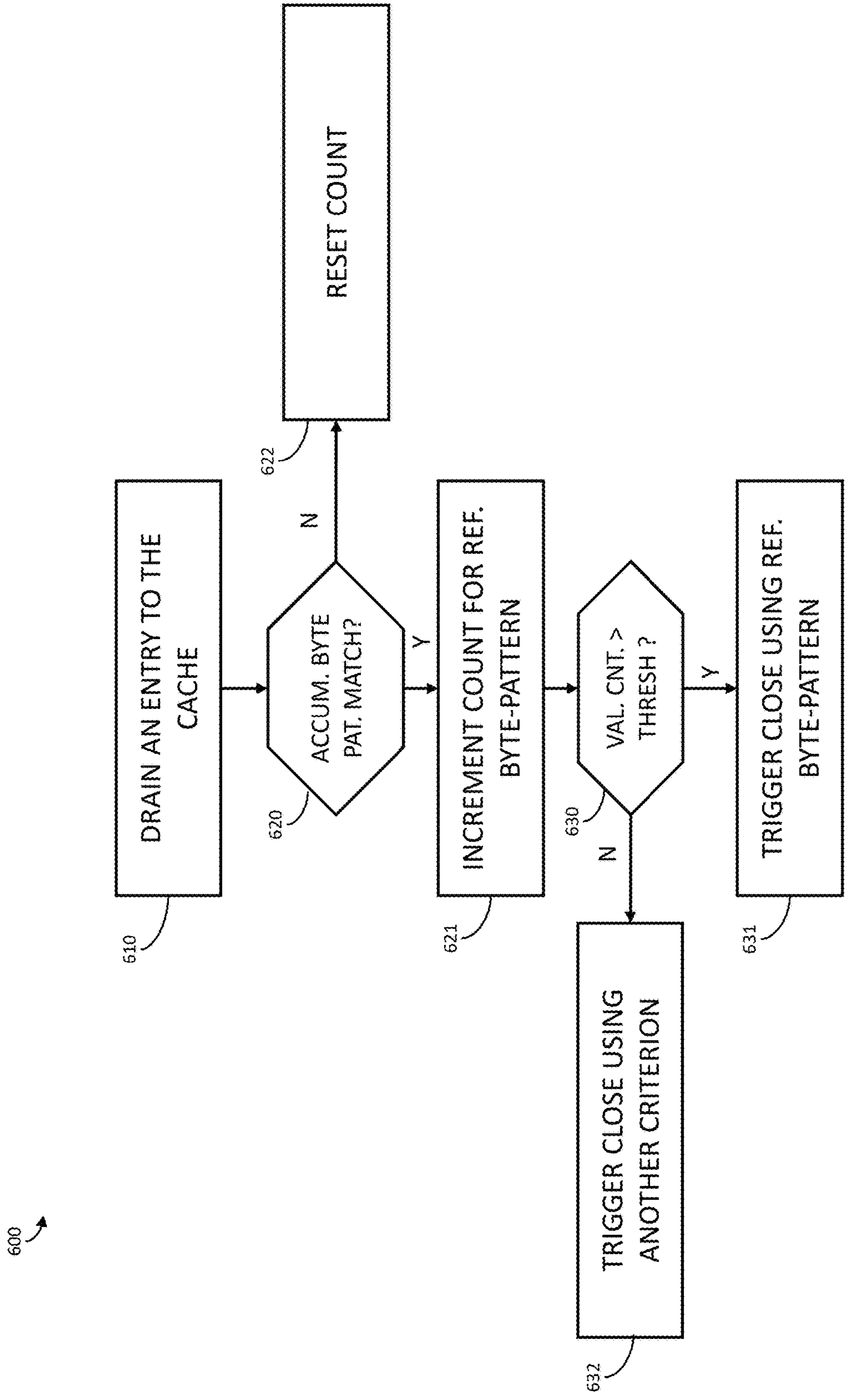
FIG. 6 is a flowchart illustrating a method for learning a reference-byte pattern according to a possible implementation of the present disclosure.

FIG. 6 is a flowchart illustrating a method for learning a reference byte-pattern according to a possible implementation of the present disclosure. The method 600 (i.e., learning process) includes draining 610 (i.e., emptying) an entry (to the cache) and comparing 620 an accumulated byte-pattern of the entry to a reference byte-pattern. When the accumulated byte-pattern matches the reference byte-pattern (i.e., Y condition), then the reference byte-pattern is maintained (e.g., in a memory of the store gather buffer) and the (running) count is incremented 621 (e.g., by +1).

The method 600 further includes comparing 630 the count to a criterion (e.g., threshold). When the count is greater than or equal to the threshold (i.e., Y condition), the byte pattern is validated (i.e., learned). After validation, closing any entry in the store gather buffer, may be triggered 631 using the reference byte-pattern. In other words, after validation, a reference byte-pattern comparison, which results in a match, can trigger the entry to be closed, regardless of how many clock cycles have elapsed.

When the count is not greater than or equal to the threshold (i.e., N condition), the reference byte-pattern is not validated (i.e., not learned). Without validation, closing the entry (and any other entry) may be triggered 632 using another criterion. In a first possible implementation, the other criterion is the entry being full (i.e., all segments have been merged). In a second possible implementation, the other criterion is a default merge period has expired. In other words, a predetermined number of cycles has elapsed since the start of the merge period. The predetermined number of cycles can be a default merge period.

When comparing 620 the accumulated byte-pattern of the entry to a reference byte-pattern does not result in a match (i.e., N condition), then the method 600 includes resetting 622 the count (e.g., count=0). In this case, the accumulated byte-pattern, which caused the reset, could replace the old reference byte-pattern as the new reference byte-pattern.

Figure 7:
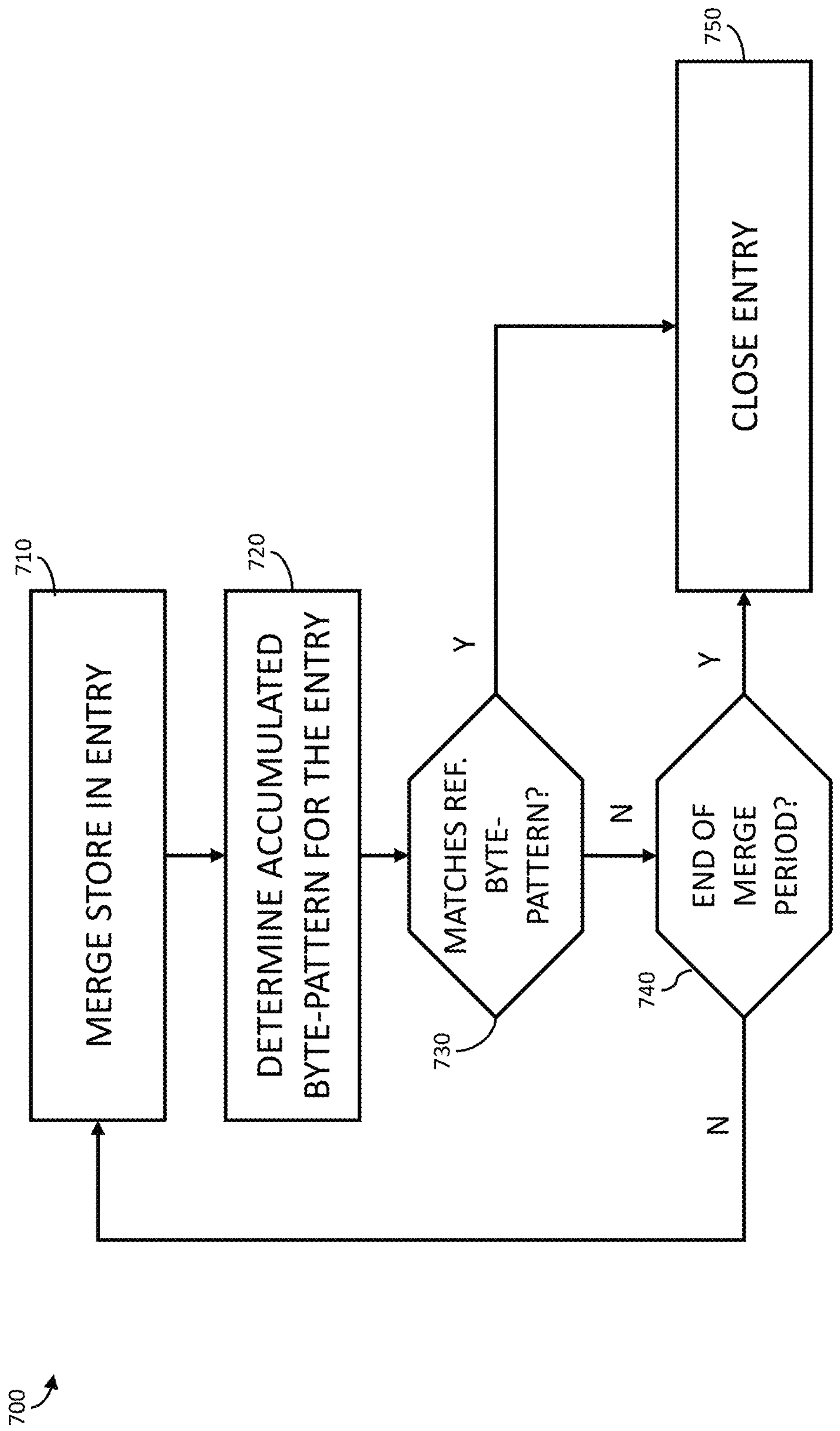
FIG. 7 is a flowchart illustrating a method for closing an entry in a store gather buffer according to a possible implementation of the present disclosure.

FIG. 7 is a flowchart illustrating a method for closing an entry in a store gather buffer according to a possible implementation of the present disclosure. The method 700 includes merging 710 the stores in an entry. In a possible implementation, the merging includes receiving a store, determining what address (e.g., cache line) the store is for, determining what portion of the cache line the store corresponds to, and writing the store to a segment of the entry corresponding to the portion of the cache line. After merging, an accumulated byte-pattern for the entry may be determined 720. The determination may be based on which bytes in the entry contain data and which bytes do not contain data. The method 700 further includes determining if the accumulated byte-pattern matches 730 a reference byte-pattern, which has been learned (see FIG. 6). When the accumulated byte-pattern matches the reference byte-pattern then the entry is closed 750. When the accumulated byte-pattern does not match the reference byte-pattern, then the method 700 includes deciding 740 if it is the end of a merge period. The decision may be made based on a capacity of the entry. In this case, if the entry is full, then it can be decided that it is the end of the merge period (i.e., Y condition) and the entry can be closed 750. The decision may be made based on a time (i.e., number of clock cycles). In this case, if a time (i.e., number of clock cycles) has elapsed, then it can be decided that it is the end of the merge period (i.e., Y condition) and the entry can be closed 750. If it is decided that it is not the end of the merge period (i.e., N condition), then the method 700 may continue merging 710.

Figure 8:
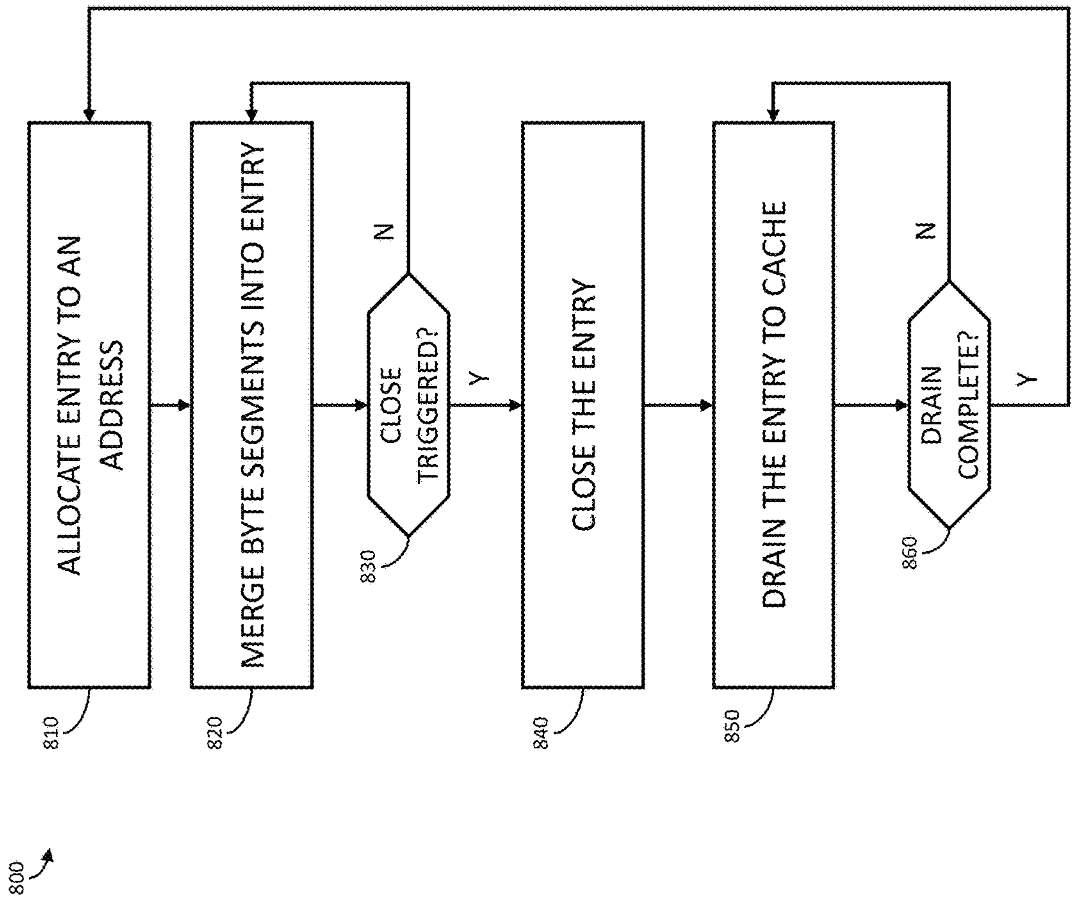
FIG. 8 is a flowchart illustrating a method for controlling a store gather buffer according to a possible implementation of the present disclosure.

FIG. 8 is a flowchart illustrating a method for controlling a store gather buffer according to a possible implementation of the present disclosure. The method 800 includes allocating 810 an entry of the store gather buffer to an address (i.e., cache line) so that all stores for the address are stored in the entry during a merge period. The method 800 further includes merging 820 byte segments (i.e., stores) into the entry. The merging can include writing stores as they are received at the store gather buffer to respective segments of the entry according to each store's byte position in the cache line.

The method 800 further includes determining 830 if closing the entry has been triggered. As described previously (e.g., see FIG. 6), closing the entry may be triggered based on a comparison between an accumulated byte-pattern and a reference byte-pattern or can be triggered using another criterion (e.g., default merge period). If closing the entry is not triggered (i.e., N condition), then the merging 820 continues and the entry remains open to receive stores. If closing the entry is triggered (i.e., Y condition), then the method 800 includes closing 840 the entry and writing-back (i.e., draining 850) the entry to a cache coupled to the store gather buffer.

The method 800 further includes determining 860 if the write-back (i.e., drain) is complete. If the write-back is not complete (i.e., N condition), then the draining 850 continues. The number of cycles that the draining repeats corresponds to a drain period of the entry, which can be a fixed number of cycles (e.g., 10 cycles). When the write-back is complete (i.e., Y condition), then the draining 850 is ended and the entry is ready to be reallocated. Accordingly, after the draining is complete (i.e., Y condition), the method 800 can repeat allocating 810 the entry. In a first possible implementation, the entry can be reallocated to a new address. In a second possible implementation, the entry may be reallocated to the same address.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A method for controlling a store gather buffer, the method comprising:

generating a reference byte-pattern based on a learning process;

allocating an entry of the store gather buffer to a cache line of a cache coupled to the store gather buffer;

writing stores, received at the store gather buffer, to respective segments of the entry during a merge period;

determining, after each of the stores is written, an accumulated byte-pattern in the entry, the accumulated byte-pattern indicating bytes of the cache line that are present and bytes of the cache line that are not present;

comparing the accumulated byte-pattern to the reference byte-pattern;

closing the entry before the merge period ends when the accumulated byte-pattern matches the reference byte-pattern; and draining the entry to write-back the accumulated byte-pattern to the cache line of the cache after closing the entry.

2. The method for controlling the store gather buffer according to claim 1, wherein:

the merge period is configured to end when the entry is full.

3. The method for controlling the store gather buffer according to claim 1, wherein:

the merge period is configured to end after a predetermined number of cycles.

4. The method for controlling the store gather buffer according to claim 1, further comprising:

not closing the entry before the merge period ends when the accumulated byte-pattern does not match the reference byte-pattern.

5. The method for controlling the store gather buffer according to claim 1, the entry is one entry of a plurality of entries and the method further includes:

increasing a count by one after draining the entry, the count corresponding to how many times any of the plurality of entries has had a respective accumulated byte-pattern that matches the reference byte-pattern.

6. The method for controlling the store gather buffer according to claim 5, further comprising:

resetting the count to zero when the accumulated byte-pattern does not match the reference byte-pattern; and generating a new reference byte-pattern by repeating the learning process.

7. The method for controlling the store gather buffer according to claim 1, wherein generating the reference byte-pattern based on the learning process includes:

detecting a first instance of a byte pattern;

storing the byte pattern to a memory as a stored byte pattern;

counting a number of consecutive times that an accumulated byte-pattern for any entry of the store gather buffer has matched the stored byte pattern; and validating the stored byte pattern as the reference byte-pattern when the number of consecutive times is greater than or equal to a threshold.

8. The method for controlling the store gather buffer according to claim 1, wherein:

the stores are segments including consecutive bytes of the cache line and determining the accumulated byte-pattern in the entry includes:

generating a string having bits corresponding to respective bytes of the cache line, wherein each bit has a value to indicate if a respective byte is present or not present in the entry.

9. The method for controlling the store gather buffer according to claim 8, wherein:

the string has a first number of bits;

the cache line has a second number of bytes; and the first number of bits equals the second number of bytes.

10. A store gather buffer, comprising:

a plurality of entries that can be allocated to store respective cache lines of a cache;

a memory containing a reference byte-pattern; and logic configured to:

write a plurality of stores, received at the store gather buffer, to respective segments of an entry during a merge period;

determine, after each store of the plurality of stores is written, an accumulated byte-pattern in the entry, the accumulated byte-pattern indicating bytes of a cache line that are present and bytes of the cache line that are not present;

compare the accumulated byte-pattern to the reference byte-pattern;

close the entry before the merge period ends when the accumulated byte-pattern matches the reference byte-pattern; and drain the entry to write-back the accumulated byte-pattern to a corresponding cache line of the cache after closing the entry.

11. The store gather buffer according to claim 10, wherein:

the merge period is configured to end when the entry is full.

12. The store gather buffer according to claim 10, wherein:

the merge period is configured to end after a predetermined number of cycles.

13. The store gather buffer according to claim 10, wherein the logic is further configured to:

not closing the entry before the merge period ends when the accumulated byte-pattern does not match the reference byte-pattern.

14. The store gather buffer according to claim 13, wherein the logic is further configured to:

detecting a first instance of a byte pattern when the accumulated byte-pattern does not match the reference byte-pattern;

storing the byte pattern to the memory as a stored byte pattern;

counting a number of consecutive times that an accumulated byte-pattern for any entry of the store gather buffer has matched the stored byte pattern; and validating the stored byte pattern as the reference byte-pattern when the number of consecutive times is greater than or equal to a threshold.

15. The store gather buffer according to claim 10, wherein:

the accumulated byte-pattern is a string having bits corresponding to respective bytes of the cache line, wherein each bit has a value to indicate if a respective byte is present or not present in the entry.

16. The store gather buffer according to claim 15, wherein:

the string has a first number of bits;

the cache line has a second number of bytes; and the first number of bits equals the second number of bytes.

17. A method for controlling a store gather buffer, the method comprising:

allocating a plurality of entries of the store gather buffer to receive stores corresponding to corresponding cache lines of a cache;

determining an accumulated byte-pattern each time any entry of the plurality of entries is drained;

incrementing a counter when the accumulated byte-pattern matches a reference byte-pattern;

validating the reference byte-pattern when a counter is greater than or equal to a threshold; and closing, after the reference byte-pattern is validated, an entry of the store gather buffer as soon as the entry contains an accumulated byte-pattern matching the reference byte-pattern.

18. The method for controlling the store gather buffer according to claim 17, further comprising:

resetting the counter when a store is received after closing the entry based on the accumulated byte-pattern matching the reference byte-pattern.

19. The method for controlling the store gather buffer according to claim 17, wherein:

the accumulated byte-pattern is a string having bits corresponding to respective bytes of a cache line, wherein each bit has a binary value to indicate if a respective byte is present or not present in the entry.

20. The method for controlling the store gather buffer according to claim 19, wherein:

the string has a first number of bits;

the cache line has a second number of bytes; and the first number of bits equals the second number of bytes.

* * * * *